United States Patent
Garcia et al.

(10) Patent No.: US 6,797,102 B2
(45) Date of Patent: Sep. 28, 2004

(54) CO-MINGLED POLYURETHANE-POLYVINYL ESTER POLYMER COMPOSITIONS AND A PROCESS FOR FORMING THE SAME

(75) Inventors: Guillermina C. Garcia, Akron, OH (US); Raymond J. Weinert, Macedonia, OH (US); Martin J. Fay, Orwigsburg, PA (US)

(73) Assignee: OMNOVA Solutions Inc., Fairlawn, OH (US)

( * ) Notice: Subject to any disclaimer, the term of this patent is extended or adjusted under 35 U.S.C. 154(b) by 0 days.

(21) Appl. No.: 10/120,807

(22) Filed: Apr. 11, 2002

(65) Prior Publication Data

US 2002/0160205 A1 Oct. 31, 2002

Related U.S. Application Data

(62) Division of application No. 09/507,775, filed on Feb. 18, 2000, now Pat. No. 6,436,540.

(51) Int. Cl.$^7$ .......................... B32B 27/30; B32B 27/40; B32B 31/26; C08J 5/00
(52) U.S. Cl. ................. 156/196; 156/273.3; 156/275.5; 156/272.2; 522/141; 522/142; 522/135; 428/423.1
(58) Field of Search .............................. 522/85, 84, 96, 522/141, 142; 525/452, 453, 455; 524/839, 840; 156/196, 227, 273.3, 275.5, 272.2; 428/423.1

(56) References Cited

U.S. PATENT DOCUMENTS

| | | |
|---|---|---|
| 4,000,047 A | 12/1976 | Ostrow et al. |
| 4,107,013 A | 8/1978 | McGinniss et al. |
| 4,302,553 A | 11/1981 | Frisch et al. |
| 4,317,895 A | 3/1982 | Guagliardo et al. |
| 4,754,001 A | 6/1988 | Blahak et al. |
| 4,780,512 A | 10/1988 | Gould et al. |
| 5,225,498 A | 7/1993 | Sorathia et al. |
| 5,237,018 A | 8/1993 | Sorathia et al. |
| 5,284,883 A | 2/1994 | Ueno et al. |
| 5,306,764 A | 4/1994 | Chen |
| 5,328,957 A | 7/1994 | Sorathia et al. |
| 5,382,626 A | 1/1995 | Credali et al. |
| 5,393,643 A * | 2/1995 | Lundy et al. ............ 430/281.1 |
| 5,539,053 A | 7/1996 | Avenel |
| 5,548,005 A * | 8/1996 | Kurth et al. ................. 523/414 |
| 5,637,657 A | 6/1997 | Anton |
| 5,652,053 A | 7/1997 | Liegeois |
| 5,739,194 A | 4/1998 | Natesh et al. |
| 5,763,529 A * | 6/1998 | Lucas ......................... 524/507 |
| 5,780,117 A | 7/1998 | Swartz et al. |
| 5,801,392 A | 9/1998 | Rex |
| 5,869,220 A * | 2/1999 | Hallock et al. .......... 430/281.1 |
| 5,905,113 A | 5/1999 | Licht et al. |
| 5,959,003 A | 9/1999 | Lo et al. |
| 6,001,915 A | 12/1999 | Schwarte et al. |
| 6,017,998 A * | 1/2000 | Duan et al. ................. 524/591 |
| 6,066,692 A * | 5/2000 | Tien et al. .................. 524/507 |
| 6,207,346 B1 * | 3/2001 | Johnson .................. 430/284.1 |
| 6,437,041 B1 * | 8/2002 | Bosch et al. ................ 524/506 |

FOREIGN PATENT DOCUMENTS

| | | |
|---|---|---|
| EP | 0331409 | 9/1989 |
| EP | 0584970 | 3/1994 |
| EP | 0705855 | 1/1997 |
| WO | WO 99/40139 * | 8/1999 |

* cited by examiner

*Primary Examiner*—Susan Berman
(74) *Attorney, Agent, or Firm*—Jagtiani + Guttag; David G. Burleson

(57) ABSTRACT

A co-mingled polyurethane-polyvinyl ester composition can be used as a coating, which has good scratch, mar and solvent resistance. The coating is derived from a waterborne polyurethane solution containing free radically polymerizable monomers such as acrylate, ultraviolet light initiators, and optionally urethane crosslinking agents. A process for forming the co-mingled polyurethane-polyvinyl ester composition comprises drying the waterborne polyurethane containing the polymerizable monomers therein and radiation polymerizing, as by ultraviolet light, the free radically polymerizable monomers on a substrate such as a plastic sheet to form a laminate. Subsequently, the laminate can be utilized to form a coating on a product as by thermoforming, where if urethane crosslinking agents are utilized, the polyurethane will be crosslinked.

22 Claims, No Drawings

CO-MINGLED POLYURETHANE-POLYVINYL ESTER POLYMER COMPOSITIONS AND A PROCESS FOR FORMING THE SAME

CROSS-REFERENCE

This is a division of application Ser. No. 09/507,775, filed on Feb. 18, 2000, now U.S. Pat. No. 6,436,540, of Guillermina C. Garcia et al., for CO-MiNGLED POLYURETHANE-POLYVINYL ESTER POLYMER COMPOSITIONS AND A PROCESS FOR FORMING THE SAME.

FIELD OF INVENTION

The present invention relates to the formation of a polyurethane-polyvinyl ester composition and to a process for forming the same utilizing ultraviolet light initiated polymerization of free radical polymerizable monomers and oligomers. The composition can then be utilized in forming laminates which can be applied to an end product as by thermoforming.

BACKGROUND OF THE INVENTION

Heretofore, it has been desirable to apply highly crosslinked coatings to the decorative laminates since such coatings exhibit good durability properties such as abrasion resistance and mar resistance as well as increase chemical resistance to solvents and cleaners. A common application for such decorative laminates involves thermoforming the laminate which desirably has a PVC substrate to an end product such as a molded part. However, such highly crosslinked coatings are subject to cracking after they are stretched during the thermoforming process.

U.S. Pat No. 5,780,117 relates to radiation-curable latex compositions having a secondary curing mechanism. In these compositions, an anionically stabilized, water-borne dispersion of one or more radiation-curable resins is combined with a low molecular weight compound having at least two reactive functional groups, wherein one reactive functional group comprises an epoxy and the other reactive functional group comprises either an epoxy or a functionality capable of self-condensation after film formation. Also disclosed is a method for providing a cross-linked protective coating on a substrate, wherein a coating of the composition of the present invention is applied to the substrate, the coated substrate is exposed to actinic radiation to effect curing, and then the unexposed or underexposed portions of the coated substrate are allowed to cure at room temperature or greater.

European Disclosure 00331409 relates to a process for producing a polyester film having a thin cured polyurethane coating, which comprises (1) applying an aqueous composition comprising a thermosetting polyurethane prepolymer as a film-forming component to at least one surface of an unoriented aromatic polyester film to form a thin wet coating on it, said polyurethane prepolymer being characterized by (i) having a polyol component at least 10% by weight of which is composed of a polyol containing a carbon-carbon double bond selected from unsaturated polyester polyols and polybutadiene polyols, the carbon-carbon double bond being cleavable under ultraviolet light, (ii) having a pendant anionic hydrophilic group in the polymer chain, and (iii) having isocyanate groups blocked with an oxime at the ends of the polymer chain, and (2) thereafter stretching and heat-setting the coated film, during which time the wet coating of the aqueous composition is dried and the polyurethane prepolymer is cured to form a thin cured polyurethane coating having a carbon-carbon double bond on the biaxially oriented polyester film.

U.S. Pat. No. 4,107,013 relates to an improved ultraviolet curable aqueous latex paint suitable for use as coil coatings comprising a high molecular weight primary latex binder in combination with minor amounts of an emulsified low molecular weight cross-linking agent adapted to cross-link the high molecular weight latex particles upon exposure to ultraviolet energy.

SUMMARY OF THE INVENTION

The composition of the present invention generally comprises a co-mingled polyurethane-polyvinyl ester composition, which has improved thermoforming properties, and has good flexibility, good scratch and abrasion resistance, and can have low gloss when containing flattening agents. The composition is derived from a waterborne polyurethane to which is added a free radical, radiation polymerizable monomers or oligomers such as various acrylates. A photoinitiator is desirable utilized in order to permit the free radical polymerizable monomers to be polymerized by ultraviolet light. Optionally, a urethane thermal-crosslinking agent can be added to the waterborne polyurethane. Generally, the aqueous polyurethane is coated on a substrate such as plastic or paper and dried in order to eliminate water. The free radical monomers or oligomers are then cured by radiation such as UV light to form a laminate. The laminate can then thermoformed onto an end product generally under heat.

DETAILED DESCRIPTION OF THE INVENTION

The waterborne polyurethanes of the present invention are commercially available. They are generally chain extended urethanes made by the reaction of one or more polyisocyanates with one or more polyol terminated intermediates and also one or more hydroxyl terminated aqueous dispersants which serve to disperse the polyurethane in water.

The polyol intermediate is generally a polyether polyol, a polythiolether polyol, a polyacetal polyol, a polyolefin polyol, an organic polyol, or a polyester polyol, or preferably a polycarbonate polyol, or combinations thereof, desirably having primary hydroxy end groups and having a number average molecular weight of from about 400 to about 15,000 and desirably from about 2,000 to about 9,000.

The polyether polyols generally contain from 2 to 1 0 carbon atoms. Such polyols include polyoxypropylene diols and triols, poly(oxyethylene-oxypropylene) diols and triols, and the like.

Poloythioether polyols which can be used include products obtained by condensing thiodiglycol either alone or with other glycols, dicarboxylic acids, formaldehyde, aminoalcohols or aminocarboxylic acids.

Polyacetal polyols which can be used include those prepared by reacting glycols such as diethylene glycol, triethylene glycol and hexanediol with formaldehyde. Suitable polyacetals may also be prepared by polymerizing cyclic acetals.

Suitable polyolefin polyols include hydroxy-terminated butadiene homo- and copolymers.

Organic polyols having molecular weights below 400 can also be used in the preparation of the prepolymers particularly include diols and triols and mixtures thereof but higher functionality polyols may be used. Examples of such lower molecular weight polyols include ethylene glycol, diethylene glycol, tetraethylene glycol bis(hydroxythyl) terephthalate, cyclohexane dimethanol, furan dimethanol, glycerol and the reaction products, up to molecular weight 399, of such polyols with propylene oxide and/or ethylene oxide.

The preferred polycarbonate polyols which can be used include products obtained by reacting diols having from 2 to 10 carbon atoms such as 1,3-propanediol, 1,4-butanediol, 1,6-hexanediol, diethyene glycol or tetraethylene glycol with diaryl carbonates having from 13 to 20 carbon atoms, for example diphenyl carbonate, or with phosgene.

The polyester polyols are typically formed from the condensation of one or more polyhydric alcohols having from 2 to 18 carbon atoms and preferably from 2 to 6 carbon atoms with one or more polycarboxylic acids or their anhydrides having from 2 to 14 carbon atoms. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monoallyl ether; glycerol monoethyl ether, diethylene glycol; 2-ethylhexanediol-1,4; cyclohexanediol-1,4; 1,2,6-hexanetriol; neopental glycol; 1,3,5-hexanetriol; 1,3-bis-(2-hydroxyethoxy)propane and the like. Cyclic ethers with desirably 2 to 18 carbon atoms may be used instead, but they are more expensive to use. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Polyesters from lactones (for example caprolactone) can also be used.

Preferred intermediates include polyester intermediates made from acids such as adipic acid or phthalic acid or isomers thereof with glycols such as ethylene glycol, propylene glycol, butylene glycol, diethylene glycol, hexamethylene glycol, trimethylolethane, or trimethylolpropane. Specific preferred polyester intermediates include poly (ethylene adipate)glycol, poly(diethylene adipate)glycol, poly(ethylene/propylene adipate)glycol, poly(propylene adipate)glycol, poly(butylenes adipate)glycol, poly (neopentyl adipate)glycol, poly(hexamethylene adipate) glycol, poly(hexamethylene/neopentyl adipate)glycol, and the like.

The hydroxyl terminated or polyol dispersant can generally be any organic compound which contains one or more carboxyl groups and two or more hydroxyl groups such as a carboxyl group containing diol or triol. Generally, such compounds can contain a total of from about 4 to about 24 carbon atoms with from about 4 to about 8 carbon atoms being preferred. And example of such a suitable dispersant has the formula

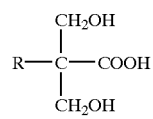

wherein R is hydrogen or alkyl containing from 1 to about 16 carbon atoms. A preferred carboxy containing diol is 2,2-dimethylol propionic acid. If desired, the carboxy containing diol or triol can be incorporated into a polyester by reaction with a dicarboxylic acid before being incorporated into the prepolymer. Useful compounds include the fumarate polyether glycols described in U.S. Pat. No. 4,460,738. Other useful carboxy-containing compounds include aminocarboxylic acids, for example lysine, cystine and 3,5-diaminobenzoic acid.

The one or more polyisocyanates which are utilized generally have the formula $R(NCO)_n$ where n usually is an integer of 2, 3 or 4 with approximately 2 being preferred. However, it is to be understood that since combinations of various polyisocyanates can be utilized, the equivalent amount of isocyanate can vary and often n is not an integer. R is an aliphatic having from about 2 to about 20 carbon atoms with from about 6 to about 15 carbon atoms being preferred, an aromatic including an alkyl substituted aromatic having from about 6 to about 20 carbon atoms with from about 6 to about 12 carbon atoms being preferred, or combinations thereof. Aliphatic diisocyanates are preferred inasmuch aromatic diisocyantes tend to yellow. Examples of suitable polyisocyanates include hexamethylene diisocyanate, 2,2,4- and/or 2,4,4-trimethyl hexamethylene diisocyanate, p- and m-tetramethyl xylene diisocyanate, methylene bis(4-cyclohexyl isocycante) (hydrogenated MDI), 4,4-methylene diphenyl isocyanate (MDI) mixtures of MDI with polymeric MDI having an average isocyanate functionality of from about 2 to about 3.2, p- and m-phenylene diisocyanate, 2,4- and/or 2,6-toluene diisocyanate (TDI), and isophorone diisocyanate (IPDI). Also useful are diisocyanates prepared by capping low molecular weight compounds, that is less than 300, such as ε-caprolactam, butanone oxime, phenol, etc., with diisocyanates. Any combination of polyisocyanates can be employed. Preferred polyisocyanates include aliphatic diisocyanates such as isophorone diisocyanate.

The equivalent weight ratio of the one or more diisocyanates to the one or more polyol intermediates as well as the one or more organic dispersants can be from about 0.8 to about 1.2, and desirably from about 0.9 to about 1.1. The mole ratio of the at least one organic dispersant is from about 0.35 to about 3.0, desirably from about 0.5 to about 2.0, and preferably from about 0.80 to about 1.2 moles per mole of the one or more polyol intermediates.

The reaction conditions of forming the polyurethane are generally known to the art and to the literature and include a reaction temperature from about 110° C. to about 320° C., desirably from about 125 to about 210° C., and preferably from about 140° C. to about 175° C. Catalysts are desirably utilized and include conventional compounds such as dibutyl tin dilaurate, stannous octoate, diazabicyclo (2.2.2) octave (DABCO), Zn ACAC., tin octoate, and the like. The amount of catalyst is small, generally from about 0.005 to about 0.2 parts by weight per 100 parts by weight of the urethane forming monomers. Any suitable solvent can be utilized in the urethane formation such as N-methyl-pyrrolidone, toluene, and the like.

Once the one or more polyurethanes has been formed, they are converted into an aqueous solution or dispersion. To obtain good solubility or dispersability in water, a neutralizing agent is added to the polyurethane solution. Neutralizing agents include inorganic bases such as ammonium, amine, and the like. When amine neutralizing agents are utilized, a number of amine groups therein can generally range from about 1 to about 3 or 4 and the total number of carbon atoms can range from about 2 or 3 to about 12. Inorganic bases include sodium hydroxide and potassium hydroxide, while the amines, in addition to ammonia include trimethylamine, triethylamine and dimethylethanolamine. The neutralizing agent can be used in either substoichiometric or excess quantities. Accordingly, the stoichiometric ratio can generally vary from about 0.9 to about 1.2 and preferably from about 1.0 to about 1.05. Use of the neutralizing agent changes the dispersant, for example the carboxyl group containing diol and triol, into a salt thereby generally rendering the polyurethane dispersible in water.

Only after the polyurethane has been neutralized, can water be added thereto to form a waterborne polyurethane solution. The amount of water is generally such that the solid content of the solution is generally from about 20 or 30 to about 65, and preferably from about 35 to about 50 percent by weight.

While optional, it is desirable to chain extend the various above noted polyurethanes. The chain extender can be a polyol, an amino-alcohol, ammonia, a primary or secondary aliphatic, alicyclic, aromatic, aryaliphatic or heterocyclic amine, especially a diamine, hydrazine or a substituted hydrazine.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine tolylene diamine, xylylene diamine, tris(2-aminoethyl) amine, 3,3'-dinitrobenzidine, 4,4'-methylenebis (2-chloroaniline), 3,3'-dichloro-4,4'-biphenyl diamine, 2,6-diaminopyridine, 4,4'-diaminophinylmethane, methane diamine, m-xylene diamine, or isophorone dimine, or combinations thereof.

The chain extension can be conducted at elevated, reduced or ambient temperatures as from about 5° C. to about 95° C., or preferably from about 10° C. to about 45° C.

The above formed and chain extended compounds are anionic waterborne polyurethanes dispersions which generally have low viscosities, i.e. less than 500 centipoises, and desirably from about 60 to about 400 centipoise, and preferably from about 120 to about 300 centipoise.

The above noted waterborne aliphatic urethane polymers are commercially available such as Neorez 9603 from Avecia; as well as R-960, A-1049, and R-9649 all from Avecia; Bayhydrol 123 from Bayer, Flexthane 620 and 630 from Air Products, and the like.

The free radical, UV polymerizable monomers and/or oligomers of the present invention are made by the free radical polymerization of unsaturated monomers or oligomers having a total of from 2 to 150 carbon atoms, desirably from about 3 to about 75, and preferably from about 6 to 20 carbon atoms such as an ester of a ethylenically unsaturated carboxylic acid, often referred to as a vinyl ester, such as acrylate and/or methacrylate, and especially alkoxylated (meth)acrylate where said "meth" group may or may not exist. These monomers and/or oligomers can generally be classified as monofunctional, difunctional, trifunctional, and multifunctional such as monofunctional, difunctional; etc., acrylates. It is to be understood that whenever the term "(meth)" is utilized, that the utilization of the methyl group in a compound is optional.

Examples of suitable monofunctional monomers include various acrylates such as 2-phenoxyethyl acrylate, ethoxylated phenol monoacrylate, lauryl acrylate, hexadecyl acrylate, stearyl acrylate, tripropylene glycol, methylether monoacrylate, neopentylglycol propoxylate (2)methylether monoacrylate, propoxylated(2–20)nonylphenol monoacrylate, and the like. Examples of other suitable alkyl(meth)acrylates have from 1–20 carbon atoms in the alkyl group and include methyl(meth)acrylate, ethyl(meth) acrylate, propyl (meth)acrylate, isopropyl(meth)acrylate, butyl(meth)acrylate, 2-ethyl (meth)acrylate, octyl(meth) acrylate, isobornyl(meth)acrylate, dodecyl (meth)acrylate, isobornyl acrylate, and cyclohexyl(meth)acrylate, and the like. Examples of suitable (meth)acrylates having ether groups include 2-methoxy-ethylmethacrylate, 2-ethoxyethylmethacrylate, and 3-methoxy-propylmethacrylate, and the like. Examples of suitable hydroxyalkyl (meth)acrylates include 2-hydroxethyl(meth) acrylate, 2-hydroxypropyl (meth)acrylate, 4-hydroxybutylacrylate, 6-hydroxyhexylacrylate, p-hydroxycyclohexyl(meth)acrylate, hydroxy-polyethylene glycol (meth)acrylates, hydroxypolypropylene glycol (meth)acrylates and alkoxy derivatives thereof, and the like.

Examples of difunctional compounds include various acrylates such as 1-6-hexanediol diacrylate, bispheonol A ethoxylated diacrylate, polyethylene glycol diacrylate (200–600), tripropylene glycol diacrylate, neopentylglycol propoxylate(2) diacrylate, ethoxylated(2) neopentyl glycol diacrylate, dipropylene glycol diacrylate, trimethylolpropane ethoxylated(3)methyether diacrylate, and the like.

Examples of trifunctional compounds include various acrylates such as trimethylolpropane triacrylate, trimethylolpropane propoxylate(5–20)triacrylate, propoxylated(4) glycerol triacrylate, ethoxylated (3) trimethylolpropane triacrylate, propoxylated pentaerythritol triacrylate, and the like.

Examples of tetrafunctional compounds include various acrylates such as ditrimethylolpropane tetraacrylate, dipentaerythritol monohydroxy pentaacrylate, and the like.

Suitable substituted (meth)acrylate compounds include (meth)acrylamide, (meth)acrylonitrile, N-methylol(meth) acrylamide, and N-alkyl(meth)acrylamides, and the like. Other suitable compounds which are simply classified as mono-unsaturated compounds include vinylchloride, vinylacetate, vinylpropionate, as well as vinylpyrrolidone, and the like.

A preferred class of free radical free polymerizable oligomers of the various above noted alkoxylated (meth) acrylate monomers generally contain 2 to about 4 or more acrylate and/or methacrylate groups or combinations of the same within the same oligomer. The ester portion of the acrylate is generally an aliphatic and desirably an alkyl having from 1 to about 10 carbon atoms. The acrylates are alkoxylated, meaning that they contain one or more alkoxy groups between the acrylate end groups and often times have a core or nucleus compound therein as known to the art and the literature such as neopentyl glycol or tripropylene glycol pentaerythritol. Generally the number of alkoxyl groups within the compound is from about 3 to about 50 with from about 3 to about 20 being preferred. Suitable alkoxy groups generally include methoxy, or ethoxy, or propoxy. Such alkoxylated acrylates are commercially available as Sartomer SR9035, SR399, SR444, and the like, all from Sartomer.

Other monomers and oligomers include urethane acrylates, epoxy acrylates, epoxy methacrylates, acrylated epoxy oligomers, acrylated aliphatic urethane oligomers, acrylated aromatic urethane oligomers, acrylated polyesters oligomers, acrylated acrylic oligomers, methacrylates, and the like.

The amount of the one or more free radically polymerizable monomers or oligomers such as the above noted vinyl esters as well as the alkoxylated acrylate monomers, is generally from about 5 to about 75, desirably from about 12 to about 60, and preferably from about 18 to about 45 parts by weight for every 100 parts by weight of the polyurethane.

A class of suitable radiation initiators such as photoinitiators, or combinations of photoinitiators and photoactivators include benzophenone and substituted benzophenones, benzoin and its derivatives such as benzoin butyl ether and benzoin ethyl ether, benzil ketals such as benzil dimethyl ketal acetophenone derivatives such as α,α-diethoxyacetophenone and α,α-dimethyl-α-hydroxyacetophenone, benzoates such as methyl-o-benzoyl benzoate, thioxaothones, Michler's ketone, and acylphosphine oxides or bis-acylphosphine oxides. Examples of other photo initiators include hydroxylcyclohexyl phenyl ketone (HCPK), 2-benzyl-2-N,N-dimethylamino-1-(4-morpholino phenyl)-1-butanone (DBMP), 1-hydroxyl cyclohexyl phenyl ketone, beozophenone, 2-methyl-1-(4-methylthio)phenyl-2-morpholino propan-1-onc (MMP), and the like.

Ultraviolet light free radical initiators also include the various nitrogen containing compounds such as AIBN (Azobisbeleronitrile and Azobutyronitrile)

Should the vinyl ester be reacted by heat instead of radiation, then in lieu of the ultraviolet light free radical initiators, etc., thermal free radical initiators such as various peroxides can be utilized as for example benzoyl peroxide, t-butyl peroxypivalate, 2,4-dichlorobenzoyl peroxide, decanoylperoxide, propionyl peroxide, hydroxyheptyl peroxide, cyclohexanone peroxide, 2,5-dimethylhexyl-2,5-di(peroxybenzoate), t-butyl perbenzoate, dicumyl peroxide, 2,5-dimethyl-2,5-di (t-butylperoxy)hexyne-3,2,5-di-methyl 2,5-di(t-butylperoxy)hexane, 3,5-dimethyl-2,5-di(benzoyl-peroxy)hexane, di-t-butyl peroxide, p-menthane hydroperoxide, cumene hydroperoxide, 2,5-dimethyl-2,5-di (hydroxperoxy)hexane, t-butyl hydroperoxide, lauroyl peroxide, t-amyl perbenzoate, or mixtures thereof. Preferred organic peroxides are benzoyl peroxide and t-butyl perbenzoate.

The amount of the various photo initiators such as ultraviolet light initiators or thermal initiators is generally from about 0.5 to about 15, desirably from about 2 to about 10, and preferably from about 4 to about 8 parts by weight per 100 parts by weight of the one or more different polymerizable monomers or oligomers such as the alkoxylated acrylates.

The above noted free radical polymerizable monomers or oligomers as well as the initiators therefore are added to the water-borne polyurethane solution and mixed. Optionally, in addition thereto, various other additives can be added to impart favorable end properties to the resulting co-mingled polyurethane-addition polymer composition. Such additives include various urethane crosslinking agents, various flattening agents, various scratch and/or mar resistant agents, wetting agents, and the like.

The various urethane crosslinking agents are desirably thermally activated and include compounds such as various (poly)aziridines, (poly)carbodimides, epoxies, melamine-formaldehyde, (poly)isocyanates, or (poly)amines, and the like. As used herein, the term aziridine refers to any alkyleneimine and includes any compound based on the following structure:

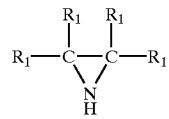

where $R_1$ independently, is hydrogen, an alkyl radical having 1 to 3 carbon atoms, phenyl or combinations thereof.

Preferably, the aziridine is based on the following structure:

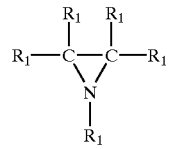

wherein $R_1$ is as described above and $R_2$ is hydrogen or an alkylene radical having 1 to 4 carbon atoms. Such aziridines include ethyleneimine, ethyl ethyleneimine and propylene-imine. The aziridine compound of the present invention also includes polyfunctional aziridines. Particularly useful polyfunctional aziridines include trimethylolpropane-tris-(B-(N-aziridinyl)propionate) and pentacrythritol-tris(B(N-aziridinyl)propionate) which are available commercially from Virginia Chemicals of Portsmouth, Va. as XAMA-2 and XAMA-7, respectively. A highly preferred aziridine is available as CX100 from Avecia.

Examples of suitable (poly)carbodimides include multi-functional carbodimides such as Ucarlnk XL-29SE from Union Carbide. Examples of suitable epoxies include bisphenol A types such as Epon 828 and 825 from Shell. Examples of suitable polyisocyanates include Desmodur DA (1,6-hexamethylene diisocyanate based polyisocyanates). Examples of suitable melamine formaldehydes include methylated melamine formaldehyde such as Cymel 373, 303, and 385 from Cytec, and Resimene from Solutia.

Such urethane crosslinking agents are thermally activated such as at temperatures of from about 80° F. to about 350° F., and from about 140° F. to about 180° F. When activated, they crosslink the polyurethane and form a more rigid polymer. The amount of such urethane crosslinking agents is generally from about 1 to about 15 and preferably from about 3 to about 10 parts by weight based upon every 100 parts by weight of the polyurethane.

Flatting agents are added to lower the gloss of the coating surface. The flatting agent migrates to the surface of the coating as the coating is dried. This produces a rough surface that randomly scatters reflected light, which creates a matte appearance.

Important considerations for selection of a flatting agent are particle size distribution, rheological effects, color/clarity, ease of dispersion and good suspension in coating solution. Typically, flatting agents are particulate materials with average particle sizes in the range of 3–12 microns. Examples of flattening agents include various urea-formaldehydes, various silicas such as precipated silica and fumed silica, talc, alumina, or calcium carbonate, and the like.

Examples of suitable urea-formaldehyde flattening agents include Pergopak M3 (mean particle size 5–7μ), from Lonza of New Jersey. Examples of suitable silica flattening agents include Syloid 7000, Syloid C-907 (a synthetic amorphacylica wherein the surface is treated with a hydrocarbon-type wax) from W.R. Grace of Maryland. The amount of such flattening agents will depend on the amount of initial gloss and the desired flatness desired. Generally speaking, the amount of such flattening agents is from about 0.1 to about 40 parts by weight, and preferably from about 0.5 to about 10 parts by weight based upon the total weight of the polyurethane and the polyvinyl ester forming monomers or oligomers.

Waxes are added to increase scratch and mar resistance. They also have an added effect of lowering gloss. Important properties for wax selection include particle-size distribution, hardness, melting temperature, and ease of dispersion. Such waxes include polyethylene wax such as micronized polyethylene wax, micronized propylene wax, micronized fluorocarbon wax, PTFE wax, or polyol ether ester wax, and the like. Polyethylene and PTFE waxes provide the best combination of toughness and lubrication for scratch and mar resistance. Such waxes are commercially available as PolyFlo 190 (a micronized fluorocarbon having a mean particle size of 10 to 12 microns, and Syn Flo 180XF (a synthetic wax and PTFE having a mean particle size of from 3 to 5 microns), and MPD-611 (a micronized polyethylene wax having a mean particle size of from 6 to 8 microns. A preferred wax is a polyethylene wax such as Shamrock Neptune 1N1 from Shamrock. The amount of such scratch and mar resistant agents will depend upon the desired resistance and generally is from about 0.1 to about 20 parts by weight and preferably from about 0.3 to about 10 parts by weight for every 100 parts by weight of the polyurethane and the polyvinyl ester forming monomers or oligomers.

Wetting agents are utilized to aid leveling of the coating and mixing of other components. Examples of suitable wetting agents include polydimethylsiloxanes such as BYK 330, 333, and 325 from BYK Chemie, alkyl sulfonates, polyethylenes such as S-379 and S-400 from Shamrock, polypropylenes, polytetrafluroethylenes (PTFE), Carnouba Wax such as S-3015 from Shamrock, and the like. The amount of such wetting agents can vary but generally is from about 0.1 to about 10 or 15, and preferably from about 0.1 to about 2.0 parts by weight for every 100 parts by weight of the polyurethane and the polyvinyl ester forming monomers or oligomers.

Initially, the waterborne polyurethane is mixed with the free radical polymerizable monomers and oligomers with a suitable amount of initiators. At this point, the various optional additives can be added such as a urethane crosslinking agent, a scratch resistance agent, a mar resistance agent, a flattening agent, a wetting agent, and the like. The aqueous mixture is then applied to a substrate and subjected to heat to drive off essentially all of the water. The substrate can be any desirable compound and preferably is in the form of a sheet or a film such as plastic, for example polyester, nylon, polyolefin, and the like with polyvinyl chloride, either rigid or flexible being preferred. Other suitable substrates include various metals, paper, and the like. One suitable method includes applying a portion of the waterborne polyurethane-polyacid monomer mixture by roll coating the substrate or by utilizing a gravure method. The waterborne urethane-free radical polymerizable monomer mixture, etc. can be heated to any suitable temperature to drive the water off at a temperature of from about 130° F. to about 200° F. As the aqueous mixture is conveyed through an oven, the water is gradually removed with a coating sheet or a film being formed on the substrate. Thus, a laminate is formed.

The coating will contain the various optional additives as well as the free radical polymerizable monomers and oligomer and photoinitiators. The sheet or film layer on the substate is then subjected to UV light in any suitable manner as being conveyed thereunder, conveyed to a suitable container such as an oven wherein an appropriate source of UV lighting is applied, or the like. The intensity and wavelength of the UV light is sufficient to initiate free radical polymerization of the monomers and oligomers polymerized the same. For example, the free radical polymerization can be initiated with a mercury vapor lamp which emits UV light over a wavelength range of 200–450 nm. Typical light intensities from Hg vapor lamps are given below.

A band (390 nm–320 nm)–600 to 200 mW/cm2
B band (320 nm–280 nm)–500 to 175 mW/cm2
C band (260 nm–250 nm)–75 to 20 mW/cm2
UV sources with higher intensities can also be used.

While the exact co-mingled polyurethane-polyvinyl ester, (e.g. polyacrylate) composition is not known, and not being bound thereto, it is thought that it can be a physical blend of the polyurethane and polyvinyl ester, or it can be an interpenetrating polymer blend thereof, or it can be a partially crosslinked system between the polyurethane and the polyvinyl ester, or any combination thereof, or one or more other types of compositions.

Regardless of the exact nature of the composition, such co-mingled polyurethane-polyvinyl ester polymer composition in the form of a sheet or film, on a substrate, i.e. a laminate, can be utilized in a variety of end use items. One desired end use application is as a coating for various products or end use items. Suitable products include desks, tables, or cabinet doors, wall covering, wood, or countertops. To form the coating, the laminate is adhered to the product with a suitable adhesive. Suitable adhesives include urethane, ethylene vinyl acetate, and epoxy based resins. The same can also be accomplished by a variety of other methods. One such method is simply to apply the comingled polyurethane-polyvinyl ester composition directly to the end product or end use item as by spraying or coating the same and then applying radiation as noted herein above to polymerize the vinyl ester monomers or oligomers. Such a method is not preferred. Another method which is desired is a thermoforming process or step in which a vacuum is generally applied to the end product to draw the co-mingled polyurethane-polyvinyl ester polymer composition laminate into contact therewith. Subsequently, or in conjunction therewith, heat is applied to the composition laminate to a suitable temperature to cause the same to adhere to the end product. It is thought that a crosslinked network can result through self-crosslinking as well as grafting of the polyurethane and the polyacid moiedies. However, the same is not known and accordingly this application is not bound thereto. If the co-mingled polyurethane-polyvinyl ester layer of the laminate contains urethane crosslinking agents therein, once applied to the substrate, it is heated to a sufficient temperature to crosslink the polyurethane. Generally temperatures of from about 220° F. to about 450° F. and desirably from about 250° F. to about 280° F. are suitable. Crosslinking, naturally will form a more rigid coating. The polyurethane generally imparts flexibility to the composition whereas the polyvinyl ester, such as polyacrylate imparts scratch and chemical resistance.

The polyurethane-polyvinyl ester composition can be utilized for a variety of end uses such as in the formation of hard durable laminates having good scratch resistance, mar resistance, stain resistance and solvent resistance; non-yellowing properties; low gloss; anti-static; and the like. Accordingly, suitable end use include laminates for desk tops, for bookcases, for table tops, for kitchen cabinets and doors, for electronic devices, molding, and the like, and the same can be made from wood, medium fiberboard, pressboard, plywood, metal, plastics and the like.

The present invention will be better understood by reference to the following examples, which serve to illustrate, but not to limit the invention.

EXAMPLES

Examples 1–4

Sample Preparation

The waterbase/UV hybrid coatings presented in this disclosure were prepared from the following formulations.

|  | Zeneca 9603 | Sartomer 9035 | Irgacure 500 | Zeneca CX100 |
|---|---|---|---|---|
| Waterborne aliphatic urethane polymer | 100 parts | | | |
| Waterborne aliphatic urethane polymer + Polyaziridine | 100 parts | | | 2 parts |
| Waterborne aliphatic urethane polymer + Ethoxylated Triacrylate | 100 parts | 11.2 parts | 0.8 parts | |
| Waterborne aliphatic urethane polymer + Ethoxylated Triacrylate + Polyaziridine | 100 parts | 11.2 parts | 0.8 parts | 2 parts |

Coatings were applied to PVC sheets with a #3 drawdown bar. The applied coatings were dried in a lab oven. Coatings containing UV curable components were passed under the UV lamps in a laboratory UV curing system to form a laminate. The PVC substrate was 0.016 inch thick with a moderately embossed surface.

Drying conditions were as follows:

| Oven Temperature | 178° F. |
|---|---|
| Oven Time | 120 seconds |

Curing (polymerization) conditions were as follows:

| UV Curing | Two 200 watts/cm lamps |
|---|---|
| Conveyor Speed | 30 yars/min |
| Approximate Dosage | 90 mJ/cm2 (250–260 nm) |

The physical testing was carried out on coated PVC films (laminate) before and after thermoforming in the Greco membrane press. The press cycle (thermoforming) is described below.

1. Coated PVC (laminate) is placed over a MDF board
2. Flexible membrane is laid over laminate and MDF board
3. The membrane is heated to 305–310° F.
4. A vacuum pulls the membrane tightly around the laminate and MDF board (thermoforming). Heat is maintained for 1 minute.
5. Heat is removed and membrane is allowed to cool for 1 minute while vacuum is maintained
6. After 1 minute cooling, vacuum is released and sample is removed.
7. Maximum surface temperature of PVC is measured and recorded with a temperature indicating tape. The target temperature was 180° F.

The following test procedures were used to measure coating durability

Scratch Resistance

Scratch resistance was measured with a "Balance Beam Scrape Adhesion and Mar Tester" that is manufactured by the Paul N. Gardner Company, Inc. A Hoffman stylus was used to scratch the coatings. The scratch resistance given in the table above is the high stylus load the coating can withstand with out scratching.

Burnish Mar

Mar resistance was determined by firmly rubbing a polished porcelain pestle on the coating surface. The severity of a mark is visually assesses as Moderate, Slight or None.

Solvent Resistance (MEK Double Wipes)

A cloth towel was soaked with MEK and gently rubbed on the coated surface in a back and forth manner. One back and forth movement was counted as one wipe. The coated surface was wiped until a break in the coating surface first became visible.

Coating Crack

After thermoforming the coated PVC films to molded MDF parts, the corners and edges were visually inspected for coating cracks.

Discussion of Results

Physical test results are given in Table 1.

Addition of the ethoxylated triacrylate to the waterborne aliphatic urethane dispersion resulted in improved scratch and mar resistance. The results also show an improvement in scratch and mar resistance after thermoforming.

The ethoxylated triacrylate produced a greater increase in scratch and mar resistance than the thermal crosslinker, polyaziridine. However, the best scratch and mar resistance is obtained with a combination of ethoxylated triacrylate and polyaziridine.

Addition of the ethoxylated triacrylate resulted in a modest increase in solvent resistance.

TABLE I

Durability Test results from UV/Waterbase Hybrid Coatings

| Coating | Thermo-formed | Scratch Resistance (g) | Burnish Mar | MEK Double Wipes | Coating Crack |
|---|---|---|---|---|---|
| Example 1 Waterborne aliphatic urethane polymer (Zeneca 9603) | No | 1900 | Moderate | 11 | — |
| | Yes | 2100 | Moderate | 24 | None |
| Example 2 Waterborne aliphatic urethane polymer (Zeneca 9603) + Polyaziridine (CX100) | No | 2200 | Moderate | 12 | — |
| | Yes | 2800 | Moderate–Slight | 17 | None |
| Example 3 Waterborne aliphatic urethane polymer (Zeneca 9603) + Ethoxylated Triacrylate (Sartomer 9035) | No | 2500 | Moderate–None | 20 | — |
| | Yes | 3200 | Slight–None | 21 | None |
| Example 4 Waterborne aliphatic urethane polymer (Zeneca | No | 3000 | Slight–None | 22 | — |
| | Yes | 3500 | None | 21 | None |

TABLE I-continued

Durability Test results from UV/Waterbase Hybrid Coatings

| Coating | Thermo-formed | Scratch Resistance (g) | Burnish Mar | MEK Double Wipes | Coating Crack |
|---|---|---|---|---|---|
| 9603) + Ethoxylated Triacrylate (Sartomer 9035) + Polyaziridine (CX100) | | | | | |

Examples 5–9

Low Gloss Waterborne/UV Hybrid Coating for Paper and Plastic Decorative Laminate The disclosed coating describes a waterborne/UV hybrid coating for thermoformable vinyl laminates. These laminates are widely used as thermoformable foils for molded substrates. A common example of this application is kitchen cabinet doors.

Flattening agents are often added to protective coatings to produce a low gloss appearance. The following example describes the effect of flatting agents and polyethylene wax to the durability of waterborne/UV hybrid coatings.

Sample Preparation

The waterborne/UV hybrid coatings presented in this disclosure were prepared from the following formulations.

| Examples | Zenec-9603 Waterborne aliphatic urethane polymer | Sartomer-9035 Ethoxylated Triacrylate | Ciba Geigy-Irgacure 500 UV photoinitiator | Zeneca-CX100 Polyaziridene | Shamrock Neptune 1N1 Polyethylene wax | W.R. Grace Syloid 7000 Silica Flatting Agent | Martinswerk Pergopak M3 Ureaformaldehyde flat- |
|---|---|---|---|---|---|---|---|
| 5 | 100 | 11.2 | 0.8 | 2 | | | |
| 6 | 87.75 | 10 | 0.75 | 3 | | 3 | |
| 7 | 87.75 | 10 | 0.75 | 3 | | | 3 |
| 8 | 87.75 | 10 | 0.75 | 3 | 1 | 1 | |
| 9 | 87.75 | 10 | 0.75 | 3 | 1 | | 1 |

Coats were applied to PVC sheets in a manner as described hereinabove with regard to Examples 1 through 4. Similarly, the same tests and test procedures were utilized. The results of the test were as follows:

Testing Results

Examples 5 to 9: Durability Test results from Low Gloss UV/Waterborne Hybrid Coatings

| | Thermo-formed | Scratch Resistance (g) | Burnish Mar | Coating Crack | Gloss % |
|---|---|---|---|---|---|
| Example 5: No flatting agent or polyethylene wax | No Yes | 3000 3500 | Slight–None None | — None | 44 |
| Example 6: Syloid 7000 | No Yes | 1800 1900 | Moderate Moderate | — None | 10 |
| Example 7: | No | 1400 | Moderate | — | 9 |
| Pergopak M3 | Yes | 1300 | Moderate | None | |
| Example 8: Syloid 7000 + Neptune 1N1 | No Yes | 2500 3000 | Moderate Moderate | — None | 11 |
| Example 9: Pergopak M3 + Neptune 1N1 | No Yes | 2700 4500 | Slight Slight–Moderate | — None | 11 |

As apparent from the above data, none of the coatings cracked after thermoforming. Moreover, Examples 6 through 9, which contained flattening agents contained good gloss reduction.

While in accordance with the patent statutes the best mode and preferred embodiment has been set forth, the scope of the invention is not limited thereto, but rather by the scope of the attached claims.

What is claimed is:

1. A process comprising:
    drying a mixture applied to a substrate, said mixture comprising a waterborne polyurethane solution mixed with free radical polvmerizable vinyl ester monomers or oligomers, and initiators, said polyurethane solution being neutralized;
    polymerizing said free radical polymerizable monomers or oligomers in the presence of radiation to thereby form a laminate comprising said substrate and a coating on said substrate, wherein said coating comprises a co-mingled polyurethane-polyvinyl ester composition; and
    thermoforming said laminate to an article.

2. A process according to claim 1, wherein said polyurethane is derived from at least one polyol intermediate, at least one polyol dispersant agent, and at least one polyisocyanate, wherein said polyol intermediate is a polyether polyol, a polythioether polyol, a polyacetal polyol, a polyolefin polyol, an organic polyol, a polycarbonate polyol, or a polyester polyol, or combinations thereof, wherein said polyol dispersant agent contains 1 or more carboxyl groups and 2 or more hydroxyl groups and has a total of from about 4 to about 24 carbon atoms,
    wherein, said polyisocyanate has the formula $R(NCO)_n$ where n is from about 2 to about 4, wherein R is an aliphatic having from about 2 to about 20 carbon atoms; or an aromatic or an alkyl substituted aromatic, or an aryl substituted alkyl having from about 6 to about 20 carbon atoms, an optional chain extenders, and an optional urethane crosslinker, and wherein said vinyl ester monomer or oligomer is an ester of an ethylenically unsaturated carboxylic acid.

3. A process according to claim 2, wherein said vinyl ester is an acrylate, or a methacrylate, or an alkoxylated (meth) acrylate comprising at least 2 (meth)acrylate groups wherein said (meth) group may or may not exist and from 3 to about 50 alkoxy groups, or combinations thereof;

wherein said polyol intermediate comprises said polyester polyol;

wherein, the equivalent ratio of said NCO to said OH groups of said polyol intermediate and said polyol dispersant is from about 0.8 to about 1.2; wherein said polyisocyanate comprises said aliphatic diisocyanate; and including chain extending said polyurethane.

4. A process according to claim 3, wherein said dispersant is a compound having the formula

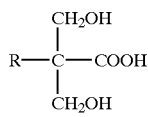

wherein R is hydrogen or an alkyl containing from 1 to about 16 carbon atoms, wherein said vinyl ester oligomer comprises said alkoxylated (meth)acrylate, wherein the number of said (meth)acrylate groups is from about 2 to about 4, wherein the ester portion of said (meth)acrylate is an alkyl having from 1 to 10 carbon atoms, and wherein the amount of said alkoxy groups is from about 3 to about 20, wherein said alkoxylated (meth)acrylate is UV polymerizable, and wherein the amount of said alkoxylated (meth)acrylated is from about 5 to about 75 parts by weight for every 100 parts by weight of said polyurethane.

5. A process according to claim 4, wherein the amount of said flatting agent is from about 0.1 to about 20 parts by weight per 100 parts by weight of said polyurethane and said polyvinyl ester, and wherein the amount of said scratch or mar resistant agent is from about 0.1 to about 20 parts by weight per 100 parts by weight of said polyurethane and said polyvinyl ester.

6. A process according to claim 4, wherein said substrate is a plastic, a metal, paper, or combinations thereof.

7. A process according to claim 3, including said polyurethane crosslinker, and crosslinking said polyurethane.

8. A process according to claim 3, wherein said substrate is a plastic, a metal, paper, or combinations thereof.

9. A process according to claim 3, wherein said polyurethane-polyvinyl ester composition includes at least one flatting agent, and at least one scratch or mar resistant agent.

10. A process according to claim 1, wherein said polyurethane-polyvinyl ester comprises a flatting agent, or a scratch or a mar resistant agent, or a wetting agent, or combinations thereof.

11. A process according to claim 10, wherein said substrate is a plastic, a metal, a paper, or combinations thereof.

12. A process of claim 1, further comprising:

mixing a polyurethane with a neutralizing agent to form a neutralized polyurethane; and mixing said neutralized polyurethane with water, one or more radiation initiable free radical polymerizable vinyl ester monomers or oligomers, and optionally a urethane crosslinking agent, to form said waterborne polyurethane solution.

13. An article, comprising:

at least a portion of the article having a laminate thermoformed thereon, said laminate comprising a cured polymeric coating on a substrate, the cured polymeric coating comprising:

a dry coating of a co-mingled poly(vinyl ester) and a cured polyurethane derived from an aqueous dispersion of a polyurethane containing one or more free radically polymerizable vinyl ester monomers of an acrylate or a methacrylate, said vinyl ester monomers being free radically polymerized in the dry coating;

said polyurethane derived from at least one polyol intermediate, at least one polyol dispersant agent, at least one polyisocyanate, a urethane crosslinker, and optionally a chain extender; and where said aqueous dispersion of said polyurethane and vinyl ester monomers are applied as a coating composition to said substrate, heated to drive off the water and form said dry coating, and said vinyl ester monomers are polymerized in the presence of said polyurethane to form the cured polymeric coating on the substrate.

14. An article according to claim 13, wherein said polyol intermediate is a polyether polyol, a polythioether polyol, a polyacetal polyol, a polyolefin polyol, a glycol, a polycarbonate polyol, or a polyester polyol, or combinations thereof, wherein said polyol dispersant contains 1 or more carboxyl groups and 2 or more hydroxyl groups and has a total of from about 4 to about 24 carbon atoms, wherein, said polyisocyanate has the formula $R(NCO)_n$ where n is from about 2 to about 4, wherein R is an aliphatic having from about 2 to about 20 carbon atoms, or an aromatic or an alkyl substituted aromatic, or an aryl substituted alkyl having from about 6 to about 20 carbon atoms.

15. An article according to claim 14, wherein the equivalent ratio of said NCO to said OH groups of said polyol intermediate and said polyol dispersant is from about 0.8 to about 1.2, wherein said polyurethane has been neutralized, and wherein said polyisocyanate comprises said aliphatic diisocyanate, and wherein said polyol intermediate comprises said polyester polyol.

16. An article, comprising:

at least a portion of the article having a laminate thermoformed thereon, said laminate comprising:

a dry polymer coating on a substrate, said coating comprising a co-mingled polyurethane and a poly(vinyl ester) polymer derived from a dried waterborne polyurethane solution containing one or more free radically polymerizable vinyl ester oligomers, said vinyl ester oligomers free radically polymerized in said dry coating, said polyurethane derived from at lease one polyol intermediate, at least one polyol dispersant agent, and at least one polyisocyanate, a chain extender, and an optional urethane crosslinker, wherein said polyol intermediate comprises a polyester polyol, wherein, said polyisocyanate has the formula $R(NCO)_n$ where n is from about 2 to about 4, wherein R is an aliphatic group having from about 2 to about 20 carbon atoms; wherein, the equivalent ratio of said NCO to said OH groups of said polyol intermediate and said polyol dispersant is from about 0.8 to about 1.2, wherein said polyurethane has been neutralized, wherein said dispersant is a compound having the formula

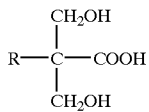

wherein R is hydrogen or an alkyl containing from 1 to about 16 carbon atoms, wherein said vinyl ester oligomer comprises alkoxylated (meth)acrylate wherein said (meth) group may or may not exist, wherein the number of said (meth)acrylate groups is from about 2 to about 4, wherein the ester portion of (meth)acrylate comprises an alkyl group having from 1 to 10 carbon atoms, and wherein the amount of alkoxy groups is from about 3 to about 20, wherein said alkoxylated (meth)acrylate is ultraviolet (UV) polymerizable, and wherein the amount of said alkoxylated (meth)acrylated is from about 5 to about 75 parts by weight for every 100 parts by weight of said polyurethane.

17. An article according to claim 16, wherein said coating is cured, and includes at least one flatting agent, and at least one scratch or mar resistant agent, wherein the amount of said flatting agent is from about 0.1 to about 40 parts by weight per 100 parts by weight of said polyurethane and said poly(vinyl ester), and wherein the amount of said scratch or mar resistant agent is from about 0.1 to about 20 parts by weight per 100 parts by weight of said polyurethane and said poly(vinyl ester).

18. An article according to claim 17, wherein said substrate is a plastic, paper, metal, wood, wallcover, fiberboard, pressboard, or plywood, or combinations thereof.

19. An article according to claim 18, wherein said article is a desktop, or a table top or a bookcase or a cabinet door, or a countertop or a wallcovering or an electronic device.

20. An article, comprising:

at least a portion of the article having a laminate thermoformed thereon, wherein said laminate comprises:

a dry polymer coating on a substrate, said coating comprising a co-mingled polyurethane and a poly(vinyl ester) polymer derived from a dried waterborne polyurethane solution containing one or more free radically polymerizable vinyl ester oligomers, said vinyl ester oligomers free radically polymerized in said dry coating where said vinyl ester oligomers comprise an alkoxylated (meth)acrylate where said (meth) group may or may not exist, where the number of said (meth)acrylate groups is at least 2, where the ester portion of said (meth)acrylate comprises an alkyl group having from 1 to about 10 carbon atoms, where the amount of said alkoxy groups is from about 3 to about 50, where said alkoxylated (meth)acrylate is UV polymerizable, and said polyurethane being cured and derived from at least one polyol intermediate, at least one polyol dispersant agent, at least one polyisocyanate, a urethane crosslinker, and optionally a chain extender.

21. An article according to claim 20, including said chain extender, wherein said polyisocyanate comprises an aliphatic diisocyanate, and wherein said polyol intermediate comprises said polyester polyol.

22. An article according to claim 21, wherein said substrate is a plastic, paper, metal, wood, wall cover, fiberboard, pressboard, or plywood, or combinations thereof.

* * * * *